United States Patent [19]
Wakai et al.

[11] Patent Number: 5,327,001
[45] Date of Patent: Jul. 5, 1994

[54] THIN FILM TRANSISTOR ARRAY HAVING SINGLE LIGHT SHIELD LAYER OVER TRANSISTORS AND GATE AND DRAIN LINES

[75] Inventors: Haruo Wakai, Fussa; Nobuyuki Yamamura, Hachioji; Syunichi Sato, Kawagoe; Minoru Kanbara, HAchioji, all of Japan

[73] Assignee: Casio Computer Co., Ltd., Tokyo, Japan

[21] Appl. No.: 41,537

[22] Filed: Apr. 1, 1993

Related U.S. Application Data

[63] Continuation of Ser. No. 734,017, Jul. 22, 1991, abandoned, which is a continuation of Ser. No. 503,455, Apr. 2, 1990, abandoned, which is a continuation-in-part of Ser. No. 241,304, Sep. 7, 1988, Pat. No. 5,032,883.

[51] Int. Cl.$^5$ .................. H01L 27/01; H01L 27/13; H01L 29/78
[52] U.S. Cl. ...................... 257/350; 257/354; 359/59; 359/88
[58] Field of Search ............ 357/23.7, 30 L; 359/59, 359/87, 88; 257/347, 350, 352, 353, 354

[56] References Cited

U.S. PATENT DOCUMENTS

| | | |
|---|---|---|
| 3,765,747 | 10/1973 | Pankratz . |
| 3,840,695 | 10/1974 | Fischer . |
| 3,862,360 | 1/1975 | Dill . |
| 4,115,799 | 9/1978 | Luo et al. ............... 357/71 |
| 4,413,883 | 11/1983 | Baraff et al. ........... 350/334 |
| 4,514,253 | 4/1985 | Minezaki .............. 156/659.1 |
| 4,582,395 | 4/1986 | Morozumi ............. 357/23.7 |
| 4,601,097 | 7/1986 | Shimbo ................. 357/30 L |

(List continued on next page.)

FOREIGN PATENT DOCUMENTS

| | | |
|---|---|---|
| 58-114453 | 7/1983 | Japan . |
| 59-15499 | 4/1984 | Japan . |
| 60-92663 | 5/1985 | Japan . |
| 60-170261 | 9/1985 | Japan . |
| 61-5576 | 1/1986 | Japan ............ 357/23.7 |
| 61-5576 | 1/1986 | Japan . |
| 61-5577 | 1/1986 | Japan ............ 357/23.7 |
| 61-153619 | 7/1986 | Japan ............ 357/23.7 |
| 61-187272 | 8/1986 | Japan . |
| 61-191072 | 8/1986 | Japan . |
| 61-220369 | 9/1986 | Japan . |
| 62-8569 | 1/1987 | Japan . |
| 62-8570 | 1/1987 | Japan . |
| 63-128756 | 6/1988 | Japan . |
| 63-197377 | 8/1988 | Japan . |
| 64-48463 | 2/1989 | Japan . |
| 1-105575 | 4/1989 | Japan ............ 357/23.7 |
| 1-137674 | 5/1989 | Japan . |
| 1-185522 | 7/1989 | Japan . |
| 1-227475 | 9/1989 | Japan . |

OTHER PUBLICATIONS

Snell et al. "Application of Amorphous Silicon Field Effect Transistors in Addressable Liquid Crystal Display Panels" Appl. Phys. vol. 24, pp. 357–362, 1981.
The TFT-A New Thin-Film Transistor, Paul K. Weimer, Proceedings of the IRE, pp. 1462–1469, Jun.
IEEE Transactions on Electron Devices, Nov. 1973, vol. ED-20, No. 11, T. P. Brody et al., "A 6 ×6 inch 20 Lines-Per-Inch Liquid-Crystal Display Panel", pp. 995–1001.

*Primary Examiner*—Ngan Ngo
*Attorney, Agent, or Firm*—Frishauf, Holtz, Goodman & Woodward

[57] ABSTRACT

A TFT array has a plurality of gate lines and a plurality of drain lines formed on a transparent insulating substrate. The gate lines intersect with the drain lines. TFTs are formed at the intersections of the gate lines and the drain lines. An opaque film is formed above the gate lines, the drain lines, and the TFTs, allowing no passage of light passing through the gaps between the transparent electrode, on the one hand, and the gate and drain lines, on the other hand. Therefore, when the TFT array is incorporated into a liquid-crystal display, the display will display high-contrast images.

8 Claims, 14 Drawing Sheets

U.S. PATENT DOCUMENTS

| | | | |
|---|---|---|---|
| 4,646,424 | 3/1987 | Parks et al. | 29/571 |
| 4,687,298 | 8/1987 | Aoki et al. | 359/59 |
| 4,704,002 | 11/1987 | Kikuchi et al. | 350/334 |
| 4,704,559 | 11/1987 | Suginoya et al. | 315/169.1 |
| 4,705,358 | 11/1987 | Yamazaki | 350/334 |
| 4,732,873 | 3/1988 | Perbet et al. | 437/101 |
| 4,733,948 | 3/1988 | Kitahara | 359/59 |
| 4,758,896 | 7/1988 | Ito | 358/236 |
| 4,759,610 | 7/1988 | Yanagisawa | 357/30 L |
| 4,776,673 | 10/1988 | Aoki et al. | 359/87 |
| 4,778,773 | 10/1988 | Sukegawa | 437/41 |
| 4,788,445 | 11/1988 | Hatanaka | 250/578 |
| 4,816,885 | 3/1989 | Yoshida et al. | 357/23.7 |
| 4,821,092 | 4/1989 | Noguchi | 357/23.7 |
| 4,853,755 | 8/1989 | Okabe et al. | 357/23.7 |
| 4,862,237 | 8/1989 | Morozumi | 357/23.7 |
| 4,917,471 | 4/1990 | Takao et al. | 359/68 |
| 4,928,161 | 5/1990 | Kobayashi | 357/71 |
| 4,935,792 | 6/1990 | Tanaka et al. | 357/23.7 |
| 4,958,205 | 9/1990 | Takeda et al. | 357/23.7 |

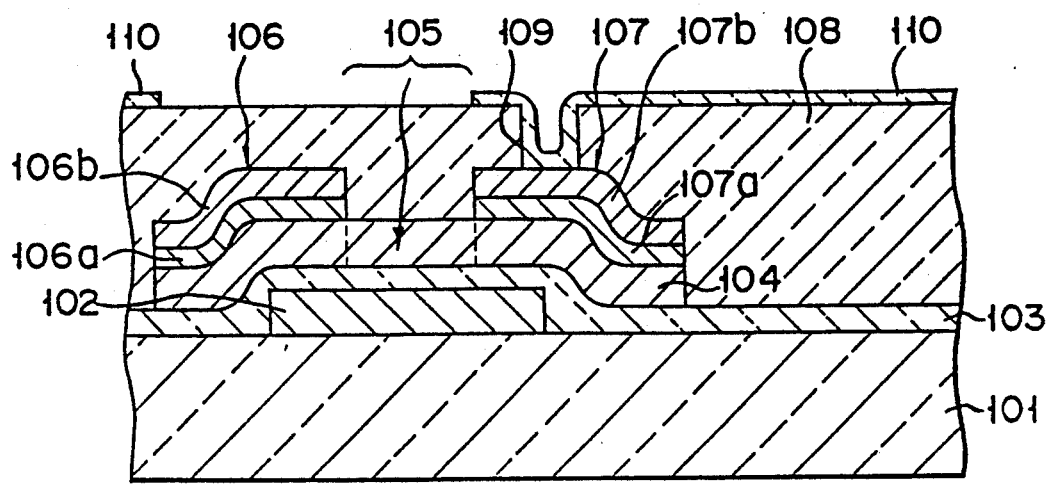
F I G. 3

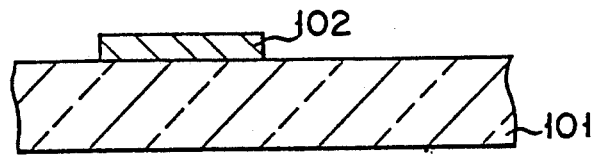
F I G. 4A
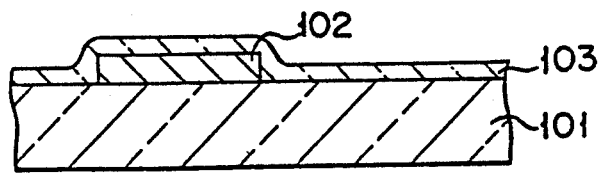
F I G. 4B
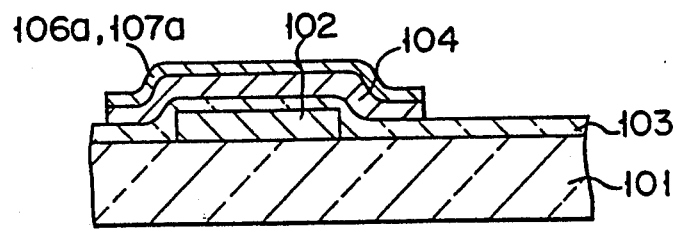
F I G. 4C
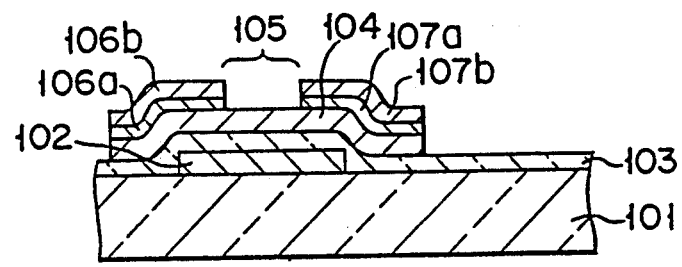
F I G. 4D
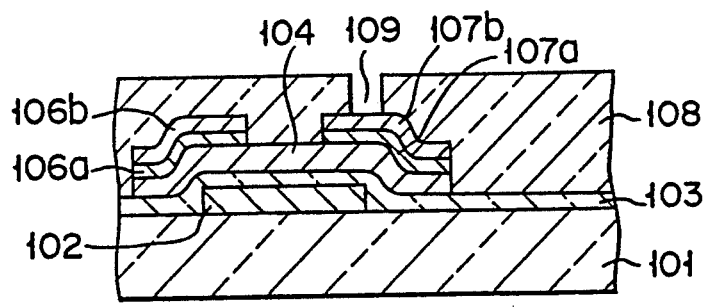
F I G. 4E
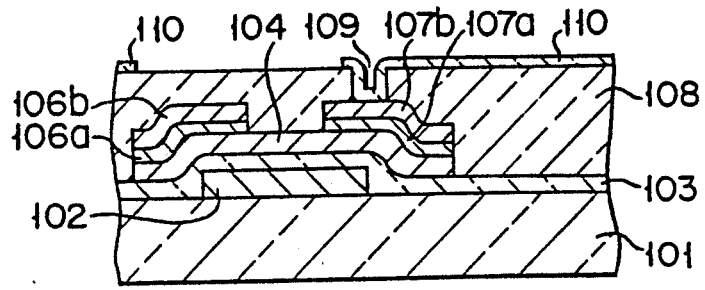
F I G. 4F

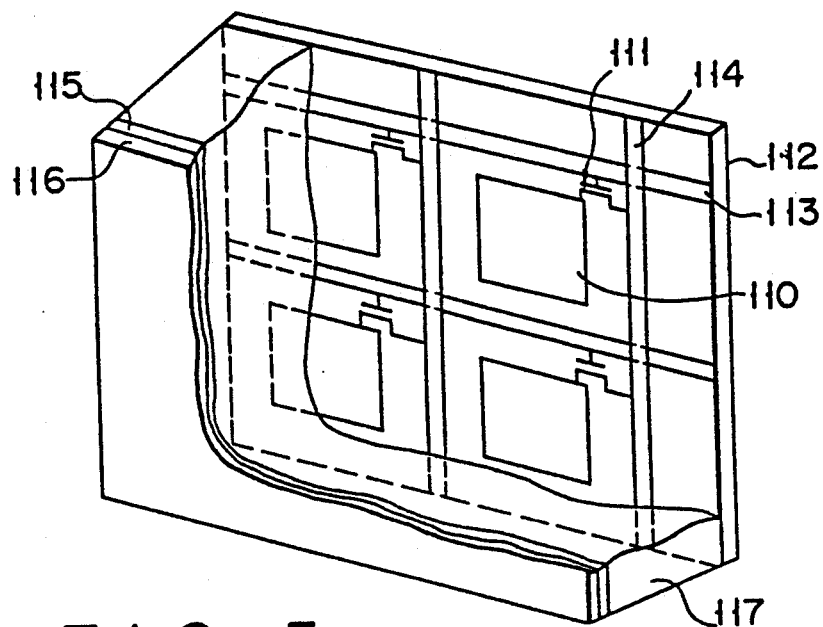
F I G. 5
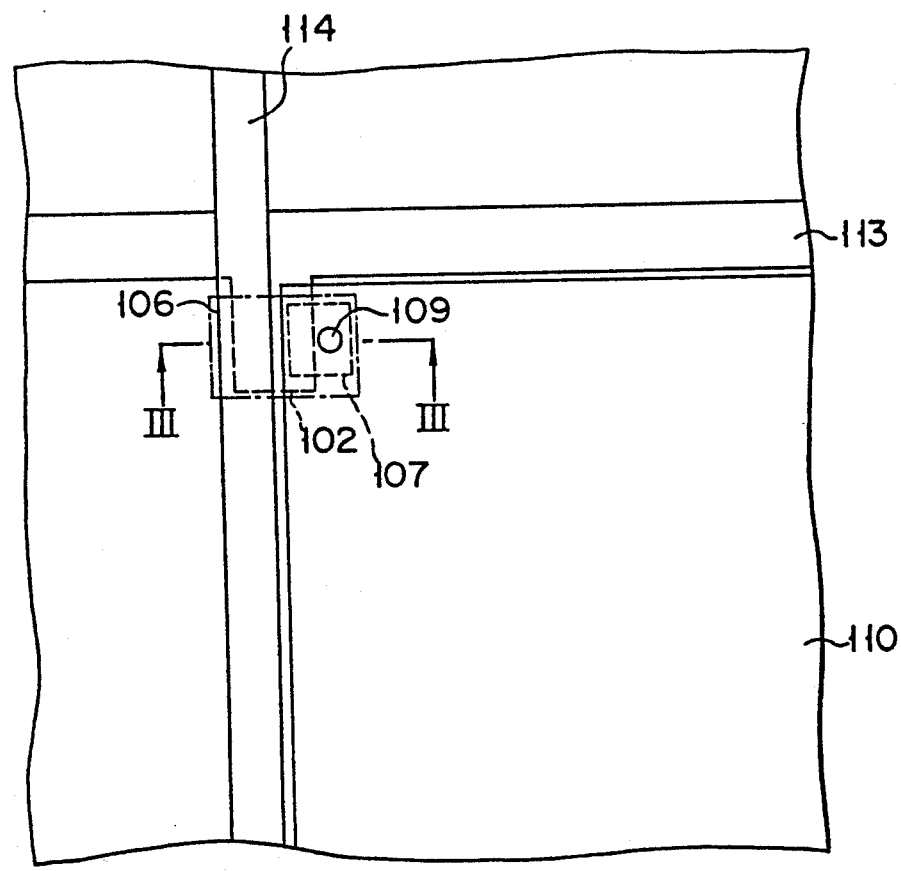
F I G. 6

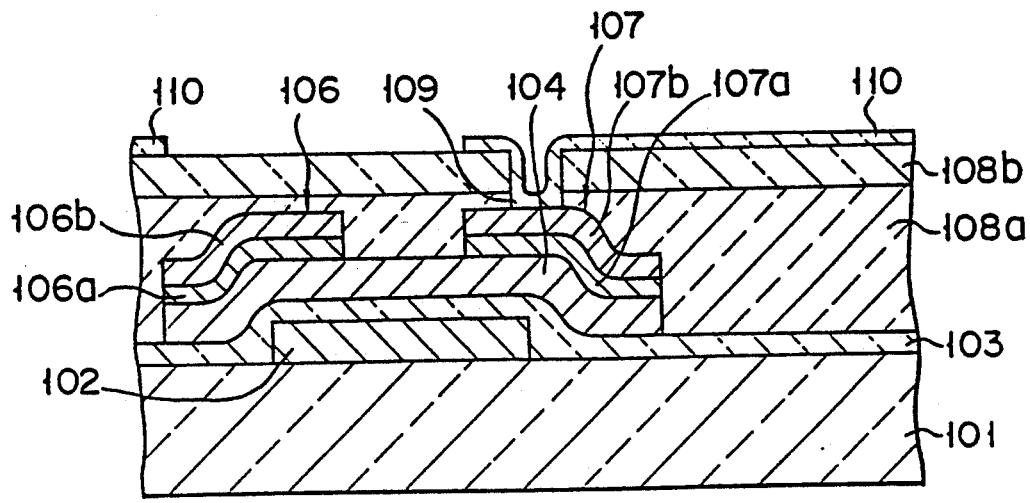
F I G. 7
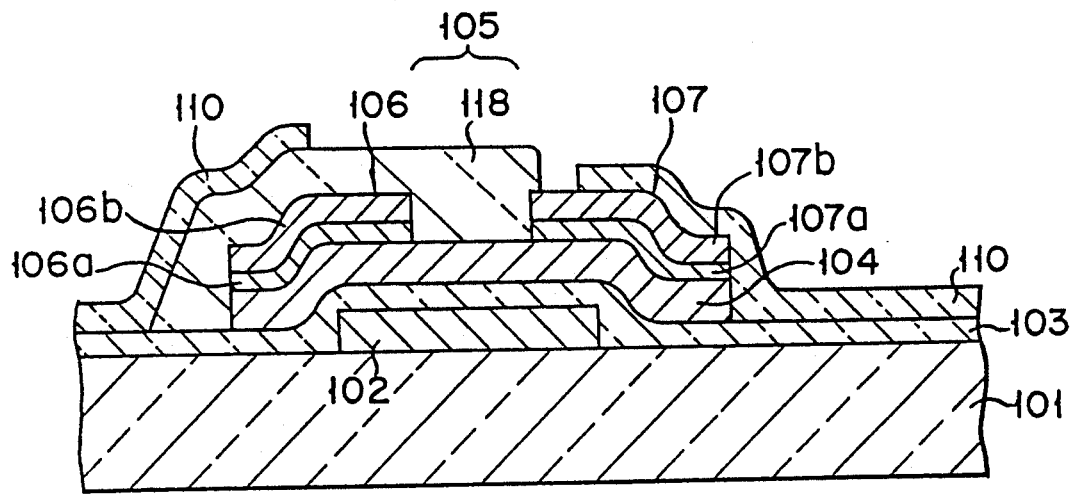
F I G. 8

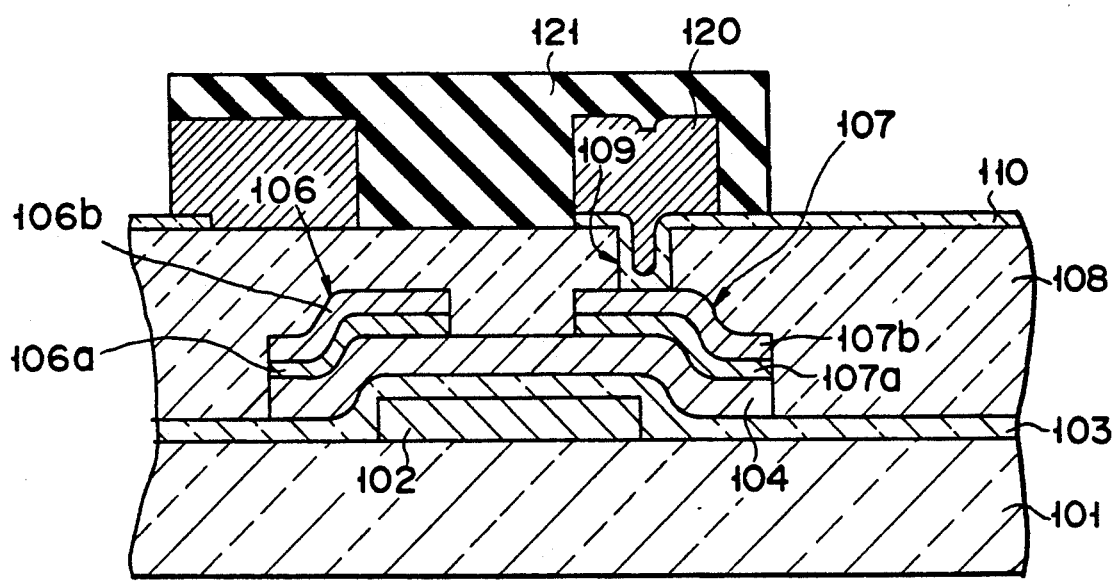
F I G. 14

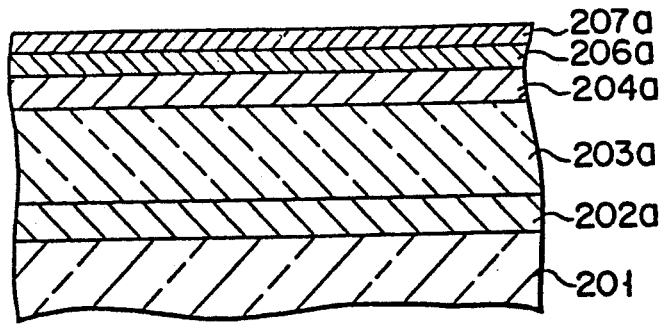
F I G. 15A
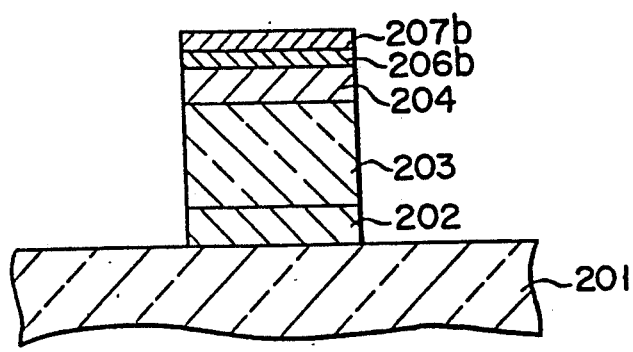
F I G. 15B
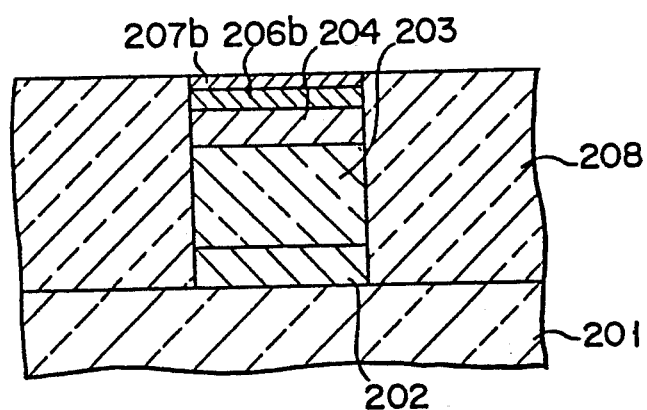
F I G. 15C
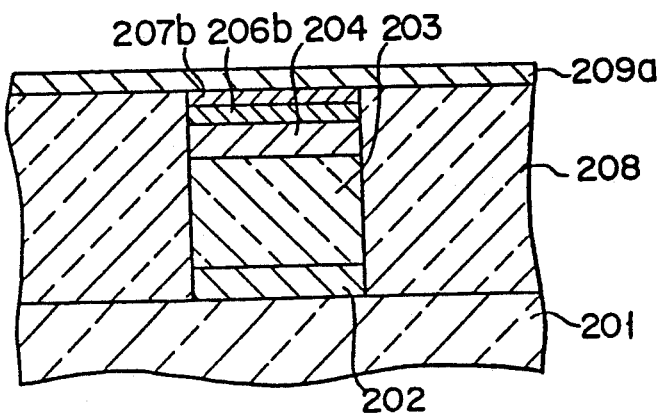
F I G. 15D

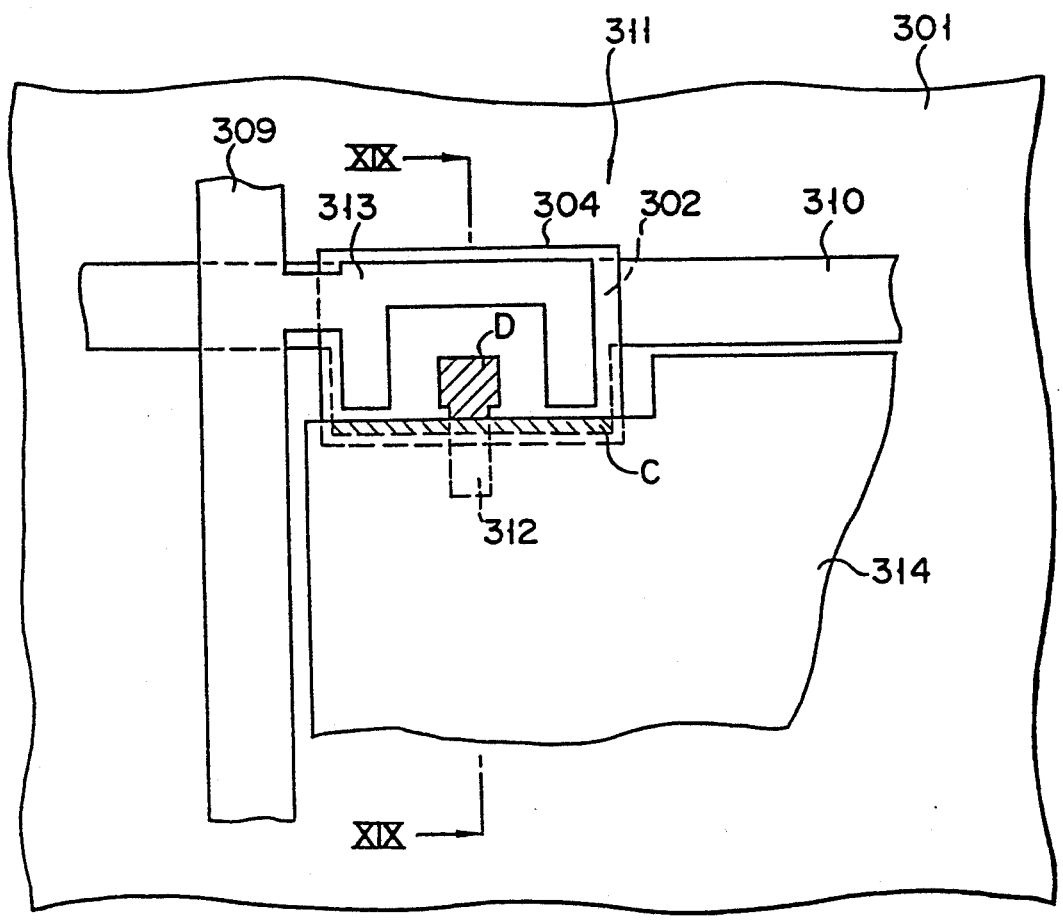
F I G. 18
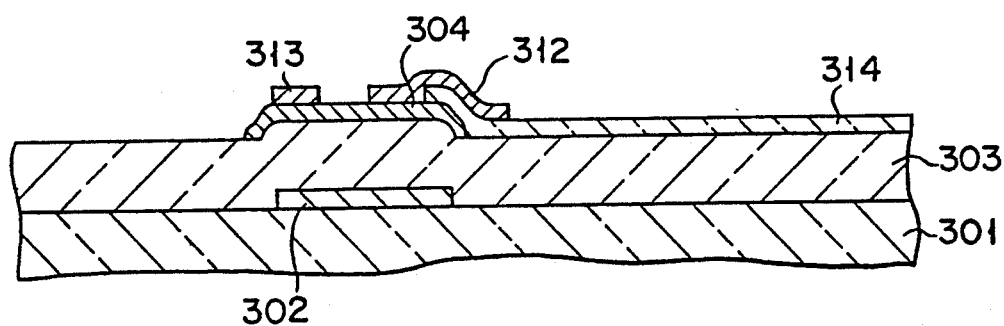
F I G. 19

THIN FILM TRANSISTOR ARRAY HAVING SINGLE LIGHT SHIELD LAYER OVER TRANSISTORS AND GATE AND DRAIN LINES

CROSS-REFERENCES TO THE RELATED APPLICATIONS

This application is a continuation, of application Ser. No. 07/734,017, filed Jul. 22, 1991, (abandoned) which is a Continuation of Ser. No. 07/241,304, filed Sep. 7, 1988 (now U.S. Pat. No. 5,032,883 issued Jul. 16, 1991).

BACKGROUND OF THE INVENTION

1. Field of the Invention

The present invention relates to a TFT (Thin Film Transistor) array having a plurality of TFTs arranged in the form of a matrix, and each having a pixel electrode and made by stacking a gate electrode, a semiconductor layer, a source electrode, a drain electrode, and the like, on a transparent insulation substrate.

2. Description of the Related Art

Conventional TFTs as switching elements are disclosed in published Examined Japanese Utility Model Application No. 44-5572 (U.S. Ser. No. 132095), Published Examined Japanese Patent Application No. 41-8172 (U.S. Ser. No. 344921), and P.K. Weimer, "The TFT - A New Thin-Film Transistor", PROCEEDINGS OF THE IRE, Jun. 15 1962. Liquid crystal display panels using such TFTs are disclosed in "A 6×6 Inch 20 lines-Per-Inch Liquid CryStal Display Panel", IEEE Transactions on Electron Device, vol. ED-20, No. Nov. 11, 1973 and U.S. Pat. No. 3,840,695.

On the other hand, U.S. Pat. Nos. 3,765,747 and 3,862,360, and Published Unexamined Japanese Patent Application Nos. 55-32026, 57-20778, and 58-21784 disclose s technique wherein a MOS transistor is formed on a monocrystalline semiconductor substrate, and the resultant structure is used as one of the substrates of a liquid crystal display panel. However, if liquid crystal panels are constituted by these semiconductor substrates, only reflection type displays can be obtained. In addition, the manufacturing processes of such panels are as complex as that of LSIs. Moreover, it Is difficult to obtain a large display panel.

The above-described active matrix liquid crystal panels, therefore, have the TFTs used as switching elements. The structures of these TFTs can be classified into a coplanar type, an inverted coplanar type, a staggered type, and an inverted staggered type, as disclosed in the article by P.K. Weimer. Of these types, the inverted staggered type TFT can be formed by stacking a plurality of thin films successively in a vacuum. For this reason, the number of manufacturing steps is substantially decreased. As a result, the characteristics of a product are stabilized, and the rate of occurrence of defective transistors is decreased.

FIGS. 1 and 2 show structures of the above-described inverted staggered type TFT and a TFT array obtained by arranging a plurality of such inverted staggered type TFTs on an insulating substrate. Referring to FIGS. 1 and 2, a plurality of TFTs 1 are arranged on a transparent insulating substrate 2 in the form of a matrix. Gate electrodes 3 of TFTs 1 are connected by a gate line 4 extending in the row direction. Drain electrodes 5 of TFTs 1 are connected by a drain line 6 extending in the column direction. A source electrode 7 of each TFT 1 is connected to a transparent electrode 8 independently formed in an area surrounded by the gate and drain lines 4 and 6 (an electrode, to which a data signal is supplied, will be referred to as a drain electrode hereinafter). More specifically, as shown in FIG. 2, the gate electrode 3 consisting of Cr or the like is formed on the transparent glass substrate 2, and a gate insulating film 9 consisting of silicon oxide or silicon nitride is formed on the upper surface of the glass substrate 2 including the upper surface of the gate electrode 3. A semiconductor film 10 consisting of amorphous silicon is stacked on the gate insulating film 9 above the gate electrode 3. Drain and source electrodes 5 and 7 are formed on the semiconductor film 10. They are separated from each other by a predetermined distance, forming channel portion 11. Drain and source electrodes 5 and 7 respectively have contact layers 5a and 7a, and metal layers 5b and 7b, and are electrically connected to the semiconductor 10. The source electrode 7 is connected to the transparent electrode 8 consisting of Indium-Tin-Oxide (to be referred to as an ITO hereinafter).

In the TFT used for the above-described TFT array, since part of the drain electrode 5, the drain line 6, and the transparent electrode 8 are formed on the gate insulating film 9, both the electrodes tend to be short-circuited, and hence the rate of occurrence of defects becomes high. Especially in the TFT array using this TFT, since the transparent electrode 8 is formed in a region surrounded by the gate and drain lines 4 and 6, short-circuiting tends to occur between the transparent electrode 8 and the drain line 6.

In order to prevent such short-circuiting, the transparent electrode 8 and the drain line 6 are spaced apart for a distance L determined by process and alignment precision in forming the transparent electrode 8 and the drain line 6. The distance L is as long as 20 $\mu$m or more.

No transparent electrodes extend over the distance L. Hence, when the TFT array is incorporated into a liquid crystal display, no voltage is applied to that portion of the liquid-crystal layer which extends over this distance L. Light therefore passes through this portion of the liquid-crystal layer, whereby the display inevitably has a low contrast.

To prevent light from passing through said portion of the liquid-crystal layer, a black mask is formed on the entire back of the substrate of the TFT array, except for that portion on which the transparent electrode is formed. (The transparent electrode is made of a transparent metal or a transparent resin.) Because of the presence of the black mask, the liquid-crystal display can have a sufficient contrast. However, the forming of the black mask requires a manual operation, and the black mask is usually displaced with respect to the transparent electrode. Consequently, light passes through a part of the transparent electrode, reducing not only the image contrast, but also the brightness of the display screen. For example, when the black mask is displaced by 20 $\mu$m with respect to the transparent electrode the opening ratio of the pixels will decrease to 50%.

SUMMARY OF THE INVENTION

The present invention has been made to solve the problem described above, and its object is to provide a TFT array which serves to provide a liquid-crystal display having high contrast, though it has black masks.

In order to achieve this object, a TFT array according to the invention comprises:

a transparent substrate;

a plurality of gate lines formed on the transparent insulating substrate;

a plurality of drain lines formed on the transparent insulating substrate and intersecting with the gate lines;

thin film transistors located at the intersections of the gate lines and the drain lines, each having at least a gate electrode, a semiconductor layer having a channel portion, a source electrode, and a drain electrode;

a transparent electrode electrically connected to the source electrodes of the thin film transistors; and an opaque film overlapping the gate lines and the drain lines.

Due to the opaque film formed on the gate lines and the drain lines, all formed on the transparent electrode, there is no gap between the transparent electrode, on the one hand, and the gate lines and drain lines, on the other, for allowing the passage of light. Hence, the TFT array serves to provide a liquid crystal display which has high contrast. Further, since the opaque film is formed also on the channel portions of the TFTs, the TFTs are not influenced by light, making no errors at all. Since the opaque film is formed on the entire surface of the substrate, it can be pattrade in a single process, and the TFT array can, thus, be manufactured easily.

BRIEF DESCRIPTION OF THE DRAWINGS

FIG. 3 is a sectional view showing an inverted staggered TFT having a pixel electrode formed on the upper surface;

FIGS. 4A to 4F are sectional views explaining the steps of manufacturing the TFT shown in FIG. 3;

FIG. 5 is a partly broken-away perspective view showing a liquid crystal display element comprising the TFT shown in FIG. 3;

FIG. 6 is a partially enlarged view illustrating an array of a plurality of TFTs;

FIG. 7 is a sectional view representing a first modification of the TFT shown in FIG. 3;

FIG. 8 is a sectional view showing a second modification of the TFT shown in FIG. 3;

FIG. 14 is a sectional view showing the TFT array shown in FIG. 13, taken along line XIV—XIV in FIG. 13;

FIGS. 15A to 15G are sectional views explaining the steps of manufacturing a TFT array according to the present invention;

FIG. 18 is a plan view illustrating another type of a TFT for use in the present invention;

FIG. 19 is a sectional view showing the TFT illustrated in FIG. 18, taken along line XIX—XIX in FIG. 18.

DETAILED DESCRIPTION OF THE PREFERRED EMBODIMENTS

Figure 1:
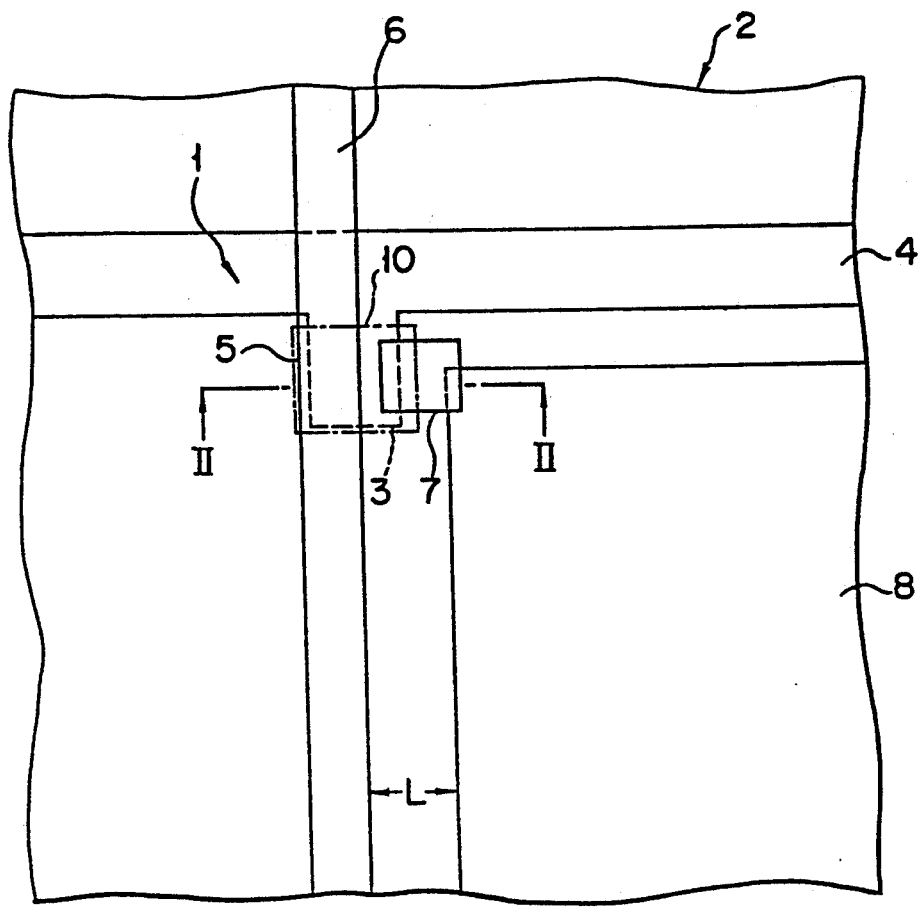
FIG. 1 is a plan view showing a conventional TFT.
Figure 2:
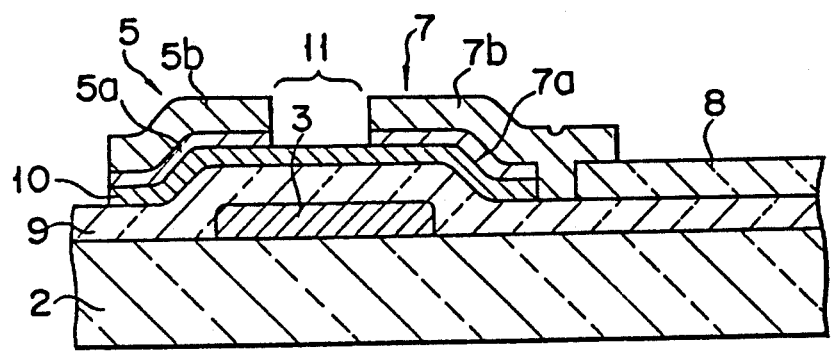
FIG. 2 is a sectional view illustrating the TFT, taken along line II—II in FIG. 1.

A TFT for use in the invention, which is an inverted staggered TFT having a pixel electrode, will now be described with reference to the accompanying drawings.

FIG. 3 is a sectional view illustrating the inverted staggered TFT. A gate electrode 102 consisting of Cr and having a thickness of about 1,000 Å is formed on an insulating substrate 101 consisting of a transparent glass plate. A gate insulating film 103 made of silicon nitride or silicon oxide and having a thickness of about 3,000 Å is formed on the upper surface of the insulating substrate 101 including the upper surface of the gate electrode 102. A semiconductor film 104 consisting of amorphous silicon and having a thickness of about 1,000 Å is formed on the gate insulating film 103, covering a portion above the gate electrode 102 and its peripheral portion. Drain and source electrodes 106 and 107 are formed on the semiconductor film 104. They are separated from each other by a predetermined distance, thus forming a channel portion 105. In order to electrically connect the drain and the source electrodes 106 and 107 to the semiconductor film 104, the electrodes 106 and 107 are respectively constituted by the contact films 106a and 107a, each made of amorphous silicon doped with an impurity in a high concentration and having a thickness of about 500 Å, and conductive layers 106b and 107b, each made of a conductive metal material such as Cr and having a thickness of about 1,000 Å. In addition, a transparent insulating film 108 made of $SiO_2$, polyimide, or an acrylic resin is deposited on substantially the entire exposed surface above the insulating substrate 101 on which the above-described films are stacked in a predetermined form. The drain electrode 106 is covered with the insulating film 108 and is insulated from other electrodes. The thickness of the insulating film 108 on the drain and the source electrodes 106 and 107 is about 3,000 Å. The insulating film 108 fills recesses generated upon formation of the above thin films, thereby smoothening the surface above the insulating substrate 101. A through hole 109 extending through the insulating film 108 is formed in a portion of the insulating film 108 above the source electrode 107. In addition, a transparent electrode 110 consisting of ITO and having a thickness of about 1,000 Å is formed on the upper surface of the insulating film 108. The transparent electrode 110 extends into the through hole 109 and hence is electrically connected to the source electrode 107. A portion of the transparent electrode 110 above a channel portion 105 of the semiconductor film 104 formed between the drain and the source electrodes 106 and 107, and its portion above the drain electrode 106 is mostly removed. That is, the transparent electrode 110 above the channel portion 105 must be removed so as to prevent an unnecessary electric field from being applied to the channel portion 105. Furthermore, in order to decrease a parasitic capacitance, the transparent electrode 110 is formed above the drain electrode 106, with its edge slightly overlapping the edge of the drain electrode 106. Note that since the parasitic capacitance is small, the transparent electrode 110 may overlap the drain electrode 106. If the thickness of the insulating film 108 formed on the drain and the source electrodes 106 and 107 is excessively small, the insulation property is degraded. In contrast to this, if it is excessively large, connection to the transparent electrode through hole 109 formed on the source electrode 107 will be difficult. For this reason, the thickness of the insulating film 108 preferably falls within the range of 2,000 to 8,000 Å.

In the TFT having the above structure, since the insulating film 108 is formed at least on the drain electrode 106, the probability of short-circuiting between the drain and the source electrodes 106 and 110 is considerably decreased. In addition, since the transparent electrode 110 is not present above the channel portion 105 of the semiconductor film 104, an unnecessary electric field is not applied to the channel portion 105, and hence the TFT can be stably operated.

With reference to FIGS. 4A to 4F it will now be explained how the TFT shown in FIG. 3 is manufactured.

As shown in FIG. 4A, a metal film having a thickness of, e.g., about 1,000 Å is deposited by means of sputtering or vapor deposition on the transparent insulating substrate 101 having a cleaned surface. The metal film is patterned by photolithography or the like to form the gate electrode 102. The insulating substrate 101 may consist of glass, quartz, sapphire, or the like. The gate electrode 102 consists of chromium, titanium, tungsten, tantalum, copper, or the like.

As shown In FIG. 4B, the gate insulating film 103 is then formed on the entire surface of the insulating substrate 101 by plasma CVD or the like so as to have a thickness of, e.g., 3,000 Å and cover the gate electrode 102. A silicon nitride (SIN) film, silicon oxide ($SiO_2$) film, or the like is used as the gate insulating film 103. Subsequently, as shown in FIG. 4C, the semiconductor film 104 made of amorphous silicon (a-i-Si) or the like and the contact film 106a (107a) made of amorphous silicon (a-n$^+$-Si) which is doped with an impurity at high concentration are continuously formed/stacked by plasma CVD or the like on the gate insulating film 103 so as to have thicknesses of, e.g., 1,000 Å and 500 Å, respectively. The semiconductor film 104 and the contact film 106a (107a) are patterned by photolithography or the like so as to cover a portion above the gate electrode 102 and its peripheral portion. Instead of the above amorphous silicon, amorphous silicon carbide (SIC), tellurium, selenium, gerumanium, cadmium sulfide (CdS), cadmium selenide (CdSe), or the like may be used as a material for semiconductor film 104 and contact film 106a (107a).

A 1,000-Å thick metal film is then formed on the entire surface above the insulating substrate 101 by vapor deposition, sputtering, or the like, thus covering the contact film 106a (107a). The metal film is patterned by photolithography or the like to remove the contact film 106a (107a) above the channel portion 05, thereby forming the drain and the source electrodes 06 and 107 above the gate electrode 102, which are separated from each other by a predetermined distance, as shown in FIG. 4D. Chromium, titanium, tungsten, tantalum, copper, or the like is used as a material for the metal films 106b and 107b of the drain and the source electrodes 106 and 107.

As shown in FIG. 4E, the transparent insulating film 108 is formed above the insulating substrate 101, covering at least the drain electrode 106 and smoothening the surface. As the transparent insulating film 108, an organic insulating film obtained by coating and baking polyimide or an acrylic resin using a spin coat method, or an $SiO_2$ inorganic insulating film (SOG film) obtained by spin-coating and baking a silanol compound. The thickness of the transparent insulating film 108 on the drain electrode 106 is about 3,000 Å. Subsequently, the through hole 109 is formed in the transparent insulating film 108 above the source electrode 107 by etching.

Finally, as shown in FIG. 4F, a transparent conductive material such as ITO, tine oxide ($SnO_2$), or Indium oxide ($In_2O_3$) is sputtered on the surface of the transparent insulating film 108 including the through hole 109 to a thickness of about 1,000 Å. Then, portions of this transparent conductive material above the channel portion 105 of the semiconductor film 104 and overlapping the drain electrode 106 through the transparent insulating film 108 are removed. With the above process, fabrication of the TFT is completed.

According to the above-described manufacturing method, since the step of forming the transparent electrode 110 in which a defect generally tends to occur becomes the last step, even if a defect occurs in this step, the immediately preceding step can be repeated, thereby reducing the ratio of occurrence of defects.

As shown in FIGS. 5 and 6, a plurality of TFTs of FIG. 3 are arranged on a transparent insulating substrate in the form of a matrix, and are used as a liquid crystal display device. More specifically, a plurality of TFTs 111 are arrayed on a transparent insulating substrate 112 in the column and the row directions. Gate electrodes 102 of the respective TFTs are commonly connected to gate line 113 in the row direction. Drain electrodes 106 of the respective TFTs are commonly connected to drain line 114 in the column direction. Source electrodes 107 of TFTs 111 are connected to transparent electrodes 110, which are substantially formed into squares, through through holes 109. Transparent electrodes 110 are respectively arranged in a plurality of regions surrounded by the gate and the drain lines 113 and 114, and are electrically independent from each other. The edges of each transparent electrode 110 are located near the gate and the drain lines 113 and 114, or slightly overlap them. The above-described sectional structure shown in FIG. 3 corresponds to a sectional structure taken along line III—III in FIG. 6.

An opposite transparent substrate 116 having a transparent electrode 115 formed on its entire surface is placed on the substrate on which TFTs 111 are arranged in the form of % matrix in the above-described manner so as to oppose it. A liquid crystal display device is obtained by sealing liquid crystal 117 between these substrates. In this liquid crystal display device, one transparent electrode 110 is a pixel electrode corresponding to one pixel for image display. These pixel electrodes do not overlap the channel portions of the TFTs connected to the adjacent pixel electrodes, and areas where the pixel electrodes overlap the corresponding drain electrodes are minimized.

The above-described liquid crystal display device is operated in the following manner. Scan signals are sequentially supplied to a plurality of the gate lines 113. Data signals for controlling the ON/OFF states of the respective pixels are supplied to a plurality of the drain lines 114 in accordance with the timings of the scan signals. TFT 111 whose gate electrode 102 has received a scan signal is turned on, reads a data signal supplied at that timing, and supplies it to the pixel electrode 110.

An electric field is applied to the liquid crystal 117 located between the pixel electrode which has received the data signal and the transparent electrode 115 of the opposite substrate 116 in accordance with a potential difference between the opposite electrodes. Then, the orientation state of the molecules of the liquid crystal 117 is changed, and thus transmission and interception of light are controlled.

As described above, in the liquid crystal display having pixel electrodes on TFTs, the transparent insulating film 108 is formed on at least the drain electrode 106 of the TFT, and the transparent electrode 110 is formed on the resultant structure. Therefore, short circuiting between the transparent electrode 110 and the drain electrode 106 can be prevented. In addition, the distance between the transparent electrode 110 and the drain electrode 106, i.e., distance L in FIG. 1, can be set to be zero. Moreover, the transparent electrode 110 may be arranged so as to overlap the drain and the gate lines 114 and 113. With this arrangement, the entire region except for an opaque region (the semiconductor film 104, the source and the drain electrodes 107 and 106, and the gate and the drain lines 113 and 114) can be made an effective display area, and hence a maximum effective display area can be obtained. According to the embodiment, an opening ratio of 70% can be realized (50% in the conventional device). Since the step of forming the transparent electrode is the last one, and the source electrodes of all the TFTs are commonly connected upon deposition of the transparent conductive film before the step of separating the transparent conductive film individually is executed operations of all the TFTs can be measured within a short period of time by bringing the probe of a measuring device into contact with a plurality of the gate and the drain lines 113 and 114, and the transparent conductive film and supplying test signals.

Modifications of the TFT shown in FIG. 3 will be described with reference to FIGS. 7 and 8. The same reference numerals in these drawings denote the same parts as FIG. 3, and a description thereof will be omitted.

FIG. 7 illustrates the first modification of the TFT shown in FIG. 3. A first and a second insulating films 108a and 108b are deposited to cover a drain and a source electrodes 106 and 107, and a transparent electrode 110 is formed on the resultant structure. The first insulating film 108a is an $SiO_2$ film obtained by dissolving a silanol compound in a solvent, coating the resultant solution by a spin coat method, and baking the coated film. The first insulating film 108a is used to flatten the uneven surface above an insulating substrate. The second insulating film 108b is a nitride film obtained by chemical vapor deposition (CVD), and is used to improve an insulation property. In the first modification of the TFT, the surface above a insulating substrate 101 can be reliably smoothened, and the insulation property and the like can be reliably protected.

FIG. 8 illustrates the second modification of the TFT shown in FIG. 3. A transparent electrode 110 is formed without flattening the surface above an insulating substrate 101. An insulating film 118 is formed on only a channel portion 105 and a drain electrode 106 so as to protect the channel portion 105 and insulate the drain electrode 106 from the transparent electrode 110. Accordingly, the transparent electrodes 110 of one TFT and an adjacent TFT are not present above the channel portion 105, and the area where the transparent electrode 110 overlaps the drain electrode 106 is small. Therefore, short-circuiting between the transparent electrode 110 and the drain electrode 106 does not occur, and an electric field is not applied from the transparent electrode 110 to the channel portion 105.

Figure 9:
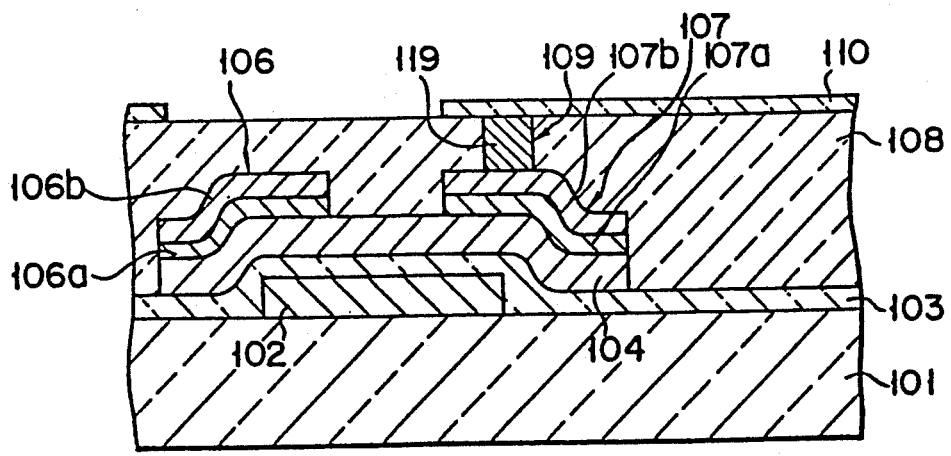
FIG. 9 is a sectional view showing a third modification of the TFT shown in FIG. 3.

FIG. 9 shows the third modification of the TFT shown in FIG. 3. A contact metal 119 consisting of a conductive metal material is buried in a through hole 109 formed above a source electrode 107, and a transparent electrode 110 is deposited on the resultant structure, thereby electrically connecting the source electrode 107 to the transparent electrode 110. The contact metal 119 consists of nickel, gold, silver, chromium, or the like, and is formed in the through hole 109 by electroless plating. In the third modification, the source and the transparent electrodes 107 and 110 are connected to each other through the contact metal 119. Therefore, electrical connection therebetween can be ensured.

Figure 10:
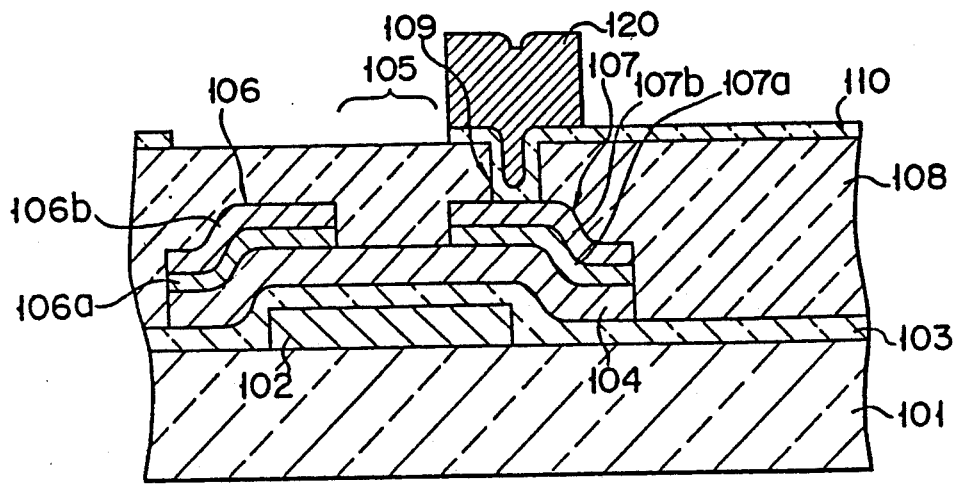
FIG. 10 is a sectional view showing a fourth modification of the TFT shown in FIG. 3.

FIG. 10 illustrates the fourth modification of the TFT shown in FIG. 3. A contact metal 120 consisting of chromium, copper, aluminum, or the like is stacked on a transparent electrode 110, which is electrically connected to a source electrode 107, formed in a through hole 109 of a transparent film 108. In the fourth modification, electrical connection between the source and the transparent electrodes 107 and 110 can be ensured.

Figure 11:
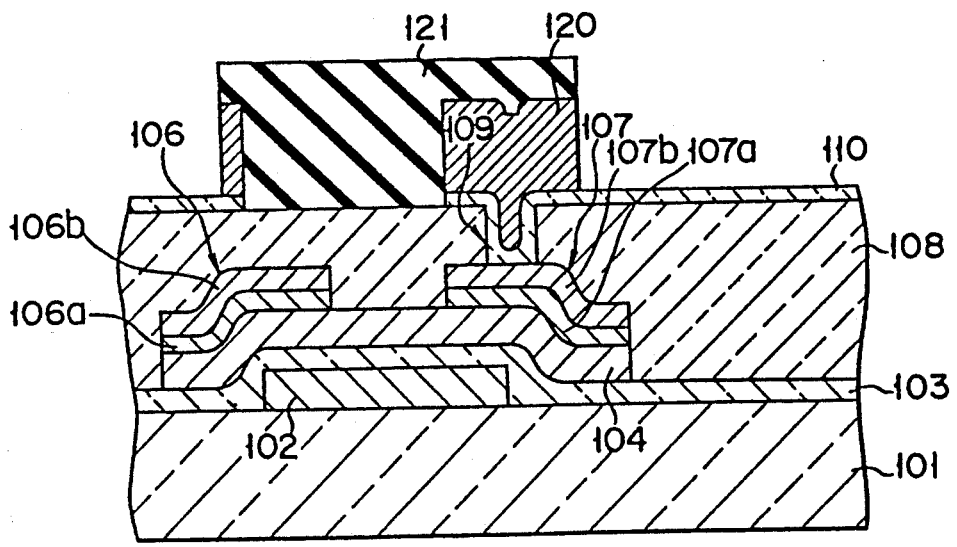
FIG. 11 is a sectional view showing a fifth modification of the TFT shown in FIG. 3.

FIG. 11 shows the fifth modification of the FTF shown in FIG. 3. A shield film 121 is formed above a contact metal 120, a channel portion 105, and a drain electrode 106 shown in the fourth modification so as to prevent a decrease in OFF resistance of the TFT due to radiation of external light onto the channel portion 105.

Figure 12A:
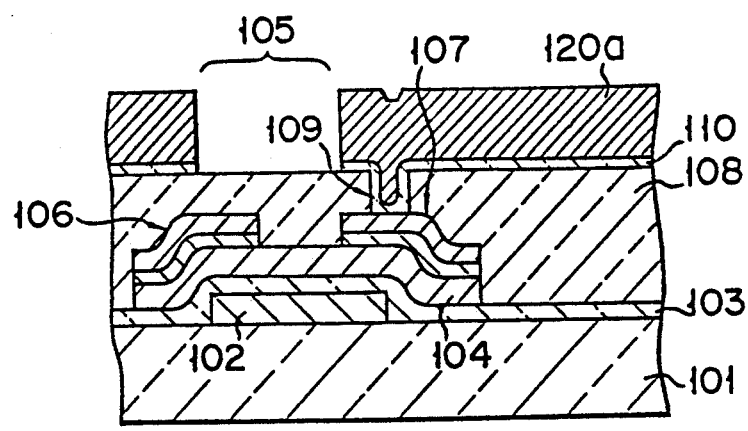
FIGS. 12A to 12C are sectional views explaining how the TFT shown in FIG. 11 is manufactured.
Figure 12B:
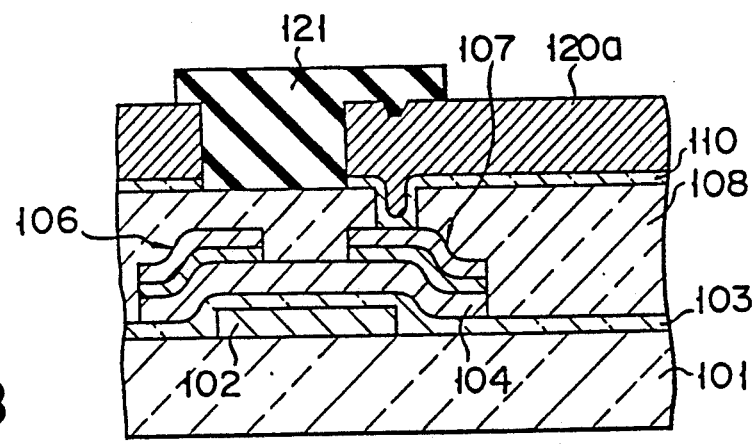
Figure 12C:
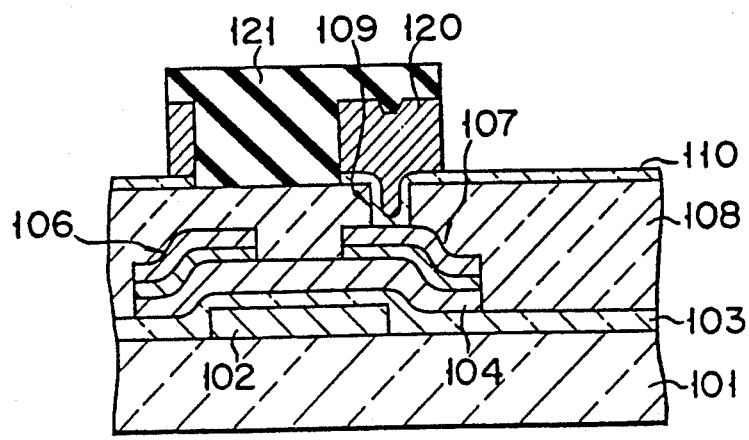

The contact metal 120 and a shield film 121 in the fifth modification are formed in the following manner. As shown in FIG. 12A, a transparent electrode film made of ITO and having a thickness of 500 to 1,000 Å and a metal conductive film 120a consisting of chromium, copper, or aluminum and having a thickness twice the depth of a through hole 109, e.g., about 6,000 Å are continuously stacked on the surface above an insulating substrate 101 including a transparent insulating film 108 and the through hole 109, and parts of the stacked films above the channel potion 105 and on a drain electrode 106 are removed. Subsequently, as shown in FIG. 12B, a shield material consisting of a nontrasnparent and insulating resin or a metal oxide is stacked on the resultant structure. Then, the shield material is etched so as to be left on regions including a region above the through hole 109 of the metal conductive film 120a and a region above the channel portion 105, thereby forming a shield film 121. After this process, as shown in FIG. 12C, the metal conductive film 120a is etched by using the shield film 121 as a resist to remove the metal conductive film 120a from the surface of the transparent electrode 110, thereby forming the contact metal 120 on the through hole 109.

In the conventional TFT array shown in FIG. 1, which is used in a liquid-crystal display, the gate line and the drain line 6 are spaced apart from the transparent electrode 8 by a distance L. Light passes through the gap between the lines 4 and 5, on the one hand, and the transparent electrode 8. Consequently, the liquid-crystal display has but an insufficient contrast.

Figure 13:
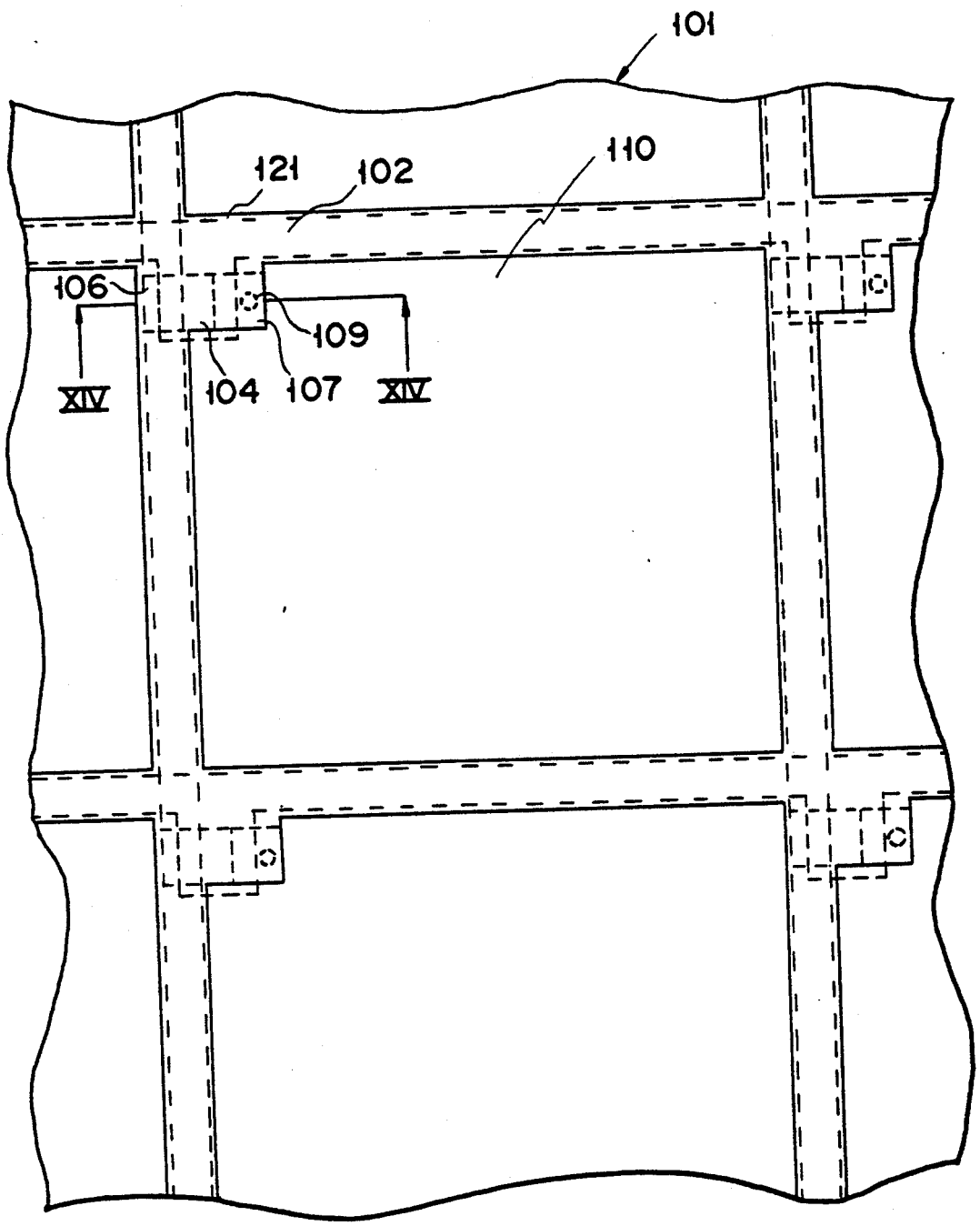
FIG. 13 is a plan view of a TFT array according to the present invention.

FIGS. 13 and 14 are a plan view and a sectional view of a TFT array according to the invention, wherein good use is made of a shield film of the type shown in FIG. 11, thereby eliminating the gap between the gate and drain lines, on the one hand, and the transparent electrode, thereby to impart a sufficient contrast to the liquid-crystal display.

As is illustrated in FIG. 13, a plurality of gate lines 102 is formed on a transparent insulating substrate 101. A plurality of drain lines 106 is also formed on the substrate 101, intersecting with the-gate lines 102. TFTs are located at the intersections of the gate lines 102 and the drain lines 106.

As is evident from FIG. 14, each of the TFTs comprises a gate electrode 102 (i.e., a part of the gate line 101), a semiconductor layer 104, a source electrode 107, and a drain electrode 106 (i.e., a part of the drain line 106). A transparent electrode 110 is formed on a transparent insulating film 108 and extends through a contact hole cut in the film 108, thus being electrically connected to the source electrode 107. A shield film 121, which is an opaque film is, formed partly on the exposed surface of the insulating film 108 and partly on the transparent electrode 110. The shield film 121 is located above the gate line 102, the drain line 106, and the channel portion of the semiconductor film 104. It should be noted that the shield film .121 is not spaced from the transparent electrode 110.

As can be understood from FIG. 13, the shield film 121 extends over the gap between the transparent electrode 110, on the one hand, and the gate and drain lines 102 and 106, on the other. Hence, no light passes through the gap between the electrode 110 and the lines 102 and 106. The liquid-crystal display having this TFT array can therefore have high contrast.

As is best shown in FIG. 14, which is sectional view taken along line XV—XV in FIG. 13, the gate lines 102 are formed on the substrate 101, and the gate insulating film 103 is formed also on the substrate 101 and the gate lines 102. Further, the semiconductor layer 104 is formed on the gate insulating film 103, opposing the gate electrode 102. The source electrode 106 and the drain electrode 107 are formed on the ends of the semiconductor layer 104, respectively.

The transparent insulating film 108 covers the thin transistors (TFTs), and has a smooth upper surface. The contact hole 107 is made in the film 108. A contact 120 made of metal is formed on the transparent electrode 110 and is partly filled in the contact hole 107. The shield film 121 is formed, covering the exposed surface of the film 108, a part of the electrode 110, and the contact 120.

Since the shield film 121 is located above the channel portion of the semiconductor layer 104, it protects the TFT from light, thus preventing the TFT from making errors.

As has been described, the shield film 121 is located above the gate lines 102, the drain line 106, and the TFTs (i.e., the channels portions of the layer 104). It allows no passage of light passing through the gap between the electrode 110, on the one hand, and the gate and drain lines 102 and 106. Therefore, when the TFT array shown in FIGS. 13 and 14 is incorporated into a liquid-crystal display, the display can display highcontrast images. Moreover, since the shield film 121 is can be formed easily, first by forming an opaque film on the entire surface of the substrate 101 and then patterning the opaque film.

Figure 15E:
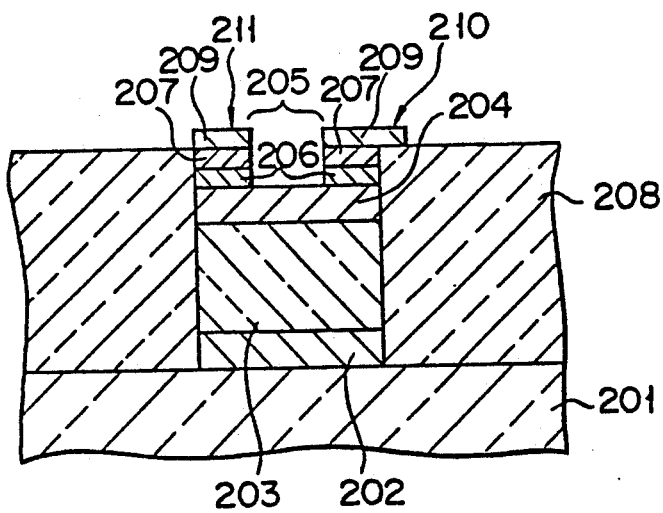
Figure 15F:
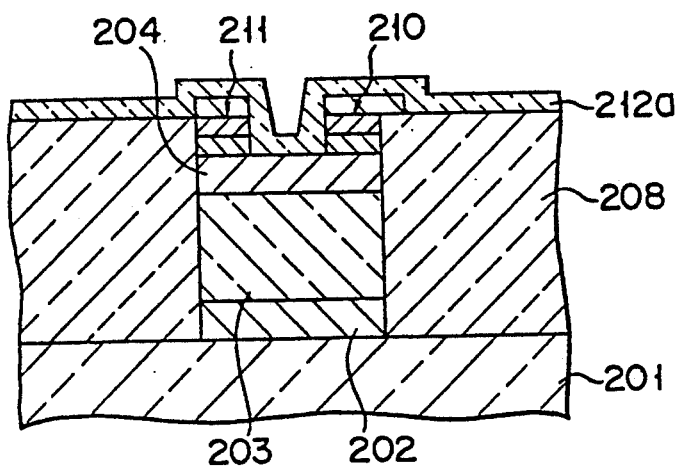
Figure 15G:
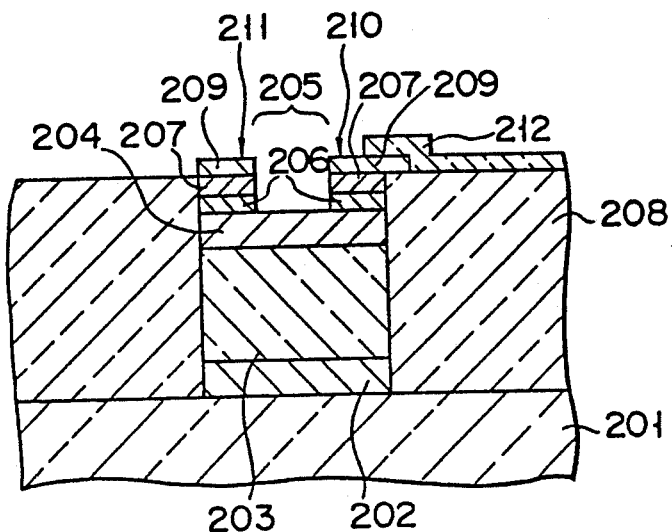

FIGS. 15A to 15G show the steps of manufacturing this TFT. FIG. 15G shows a finished TFT. As shown in FIG. 15G, in the TFT, a gate electrode 202, a gate insulating film 203, and a semiconductor film 204 are stacked on a transparent insulating substrate 201 and formed into the same shape. A contact films 206 each consisting of a semiconductor layer having a high impurity concentration, an ohmic contact electrodes 207, and a metal electrodes 209, all pairs of which have the identical shapes, are formed on the semiconductor film 204 and separated from each other by a predetermined distance to form a channel portion 205. A drain and a source electrodes 211 and 210 are respectively constituted by the contact films 206, the ohmic contact electrodes 207, and metal electrodes 209. A transparent insulating film 208 is formed on a portion outside the stacked thin films to the height of the ohmic contact electrode 207. In addition, a pixel electrode 212 is formed on the transparent insulating film 208 so as to be in contact with the metal electrode 209 of the source electrode 210.

The TFT having the above-described arrangement is manufactured in the following manner. As shown in FIG. 15A a metal film 202a consisting of chromium (Cr) molybdenum (Mo), tungsten (W), or the like is deposited on a cleaned surface of the transparent insulating substrate 201 to a thickness of, e.g., 1,000 Å by sputtering, vapor deposition, or the like. An insulating film 203a made of silicon nitride (SIN) or the like is deposited on the metal film 202a to a thickness of, e.g., about 3000 Å by plasma CVD or the like Subsequently, an amorphous silicon (a-i-Si) film 204a and a n+-type amorphous silicon (a-n+-Si) film 206a doped with a high-concentration impurity are respectively deposited on the resultant structure to thicknesses of, e.g., about 1,000 Å and 500 Å by plasma CVD or the like. In addition, an ohmic contact film 207a consisting of Cr, Ti, a noble metal silicide such as PTSi or $PT_2Si$, or the like for an ohmic contact is deposited on the n+-type amorphous silicon 206a by sputtering or the like. The steps of stacking/forming the metal film 202a, the insulating film 203a, the amorphous silicon 204a, the n+-type amorphous silicon 206a, and the ohmic contact film 207a on the transparent insulating substrate 201 are continuously performed by sputtering and plasma CVD.

As shown in FIG. 15B, the ohmic contact film 207a, the n+-type amorphous silicon 206a, the amorphous silicon 204a, the insulating film 203a, and the metal film 202a are etched to form the gate electrode 202, a gate line (not shown) for supplying scan signals to the gate electrode 202, the gate insulating film 203, the semiconductor film 204, the contact film portion 206b, and the ohmic contact electrode film 207b. The ohmic contact film 207a the n+-type amorphous silicon 206a the amorphous silicon 204a, the insulating film 203a, and the metal film 202a are continuously etched by, e.g., reactive etching. Alternatively, the n+-type amorphous silicon 206a, the amorphous silicon 204a, the insulating film 203a may be etched by plasma etching, the and metal film 202a may be etched by wet etching. Then, as shown in FIG. 15C, the transparent insulating flattening film 208 consisting of a silica film or an organic substance such as acrylic is coated above the transparent insulating substrate 201 to a height substantially equal to that of the ohmic contact electrode film 207b by a spin coating method.

If the flattening film 208 is also coated on the ohmic contact electrode film 207b upon coating the flattening film 208 on the film 207b is removed by etch back.

In addition, a metal film 209a having a small specific resistance, such as an aluminum (Al), copper (Cu), or silver (Ag) film, is deposited on the entire surfaces of the ohmic contact electrode film 207b and the flattening film 208 above the transparent insulating substrate 201 by sputtering, vapor deposition, or the like. Then, as shown in FIG. 13E, the corresponding position of the channel portion 205 of the metal film 209a, the ohmic contact metal film 207b, and the contact film portion 206b is continuously etched respectively by photolithography to form the drain and the source electrodes 211 and 210 each consisting of the metal electrode 209, the ohmic contact electrode 207, and the contact film 206, and to form a drain line for supplying image signals to the drain electrode 211.

Subsequently, as shown in FIG. 15F, a transparent conductive film 212a such as an ITO film is deposited on the entire surface above the transparent insulating substrate 201 by vapor deposition or the like.

Finally, as shown in FIG. 15G, a pixel electrode 212 is formed by photolithography or the like. With this process, a TFT active matrix panel is completed. In the TFT of this embodiment, since the gate electrode 202, the gate insulating film 203, the semiconductor film 204, the contact film 206, and the ohmic contact electrode 207 can be successively formed in a series of steps, stable characteristics can be obtained. Since the stacked films obtained by the above-described series of steps are continuously etched, the number of steps is decreased.

Figure 16:
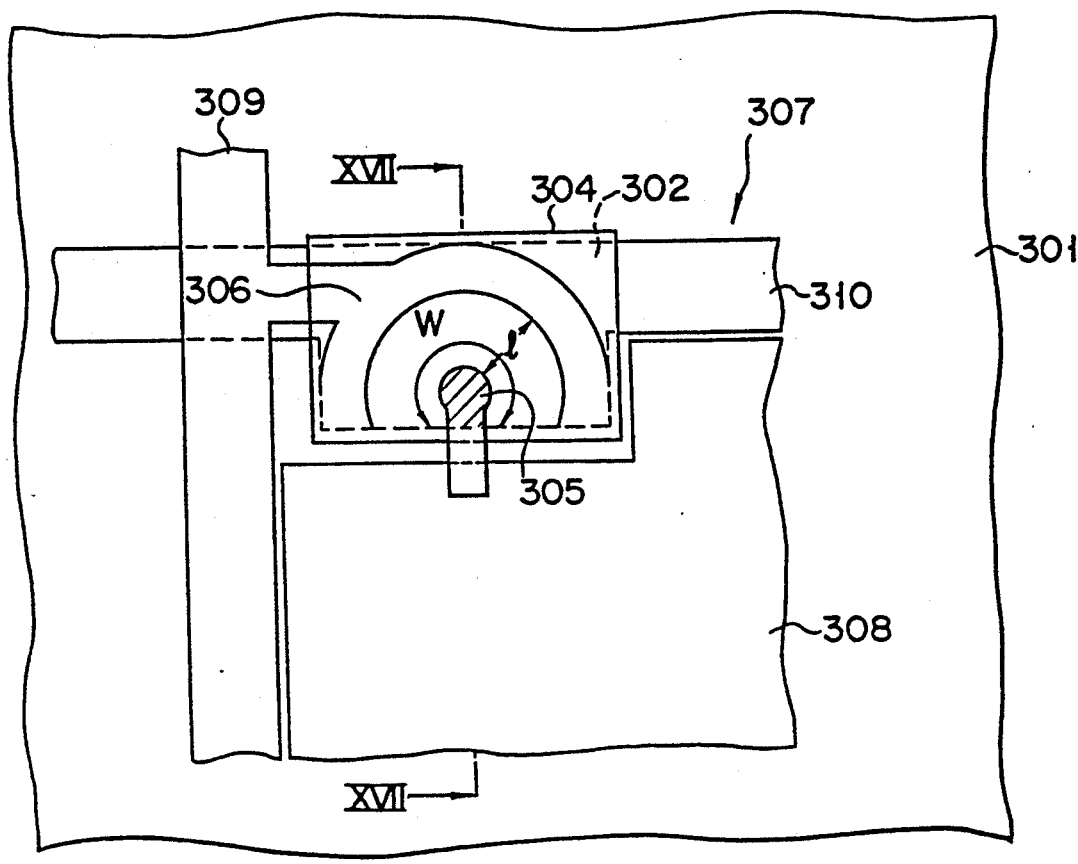
FIG. 16 is a plan view showing the structure of another type of a TFT for use in the present invention.
Figure 17:
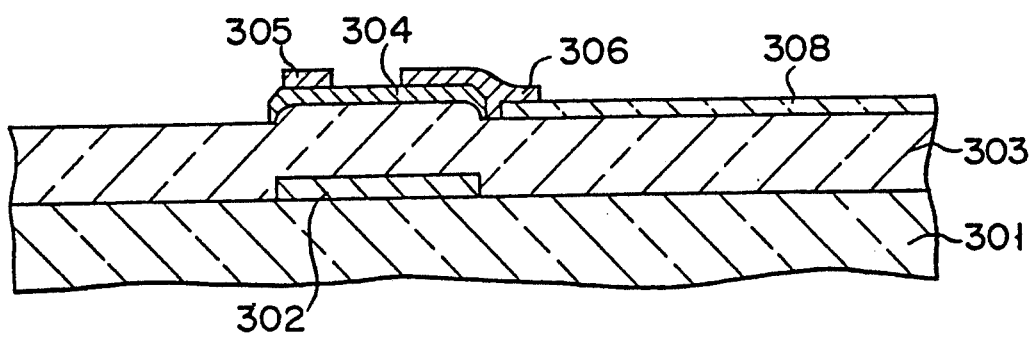
FIG. 17 is a sectional view showing the TFT shown in FIG. 16, taken along line XVII—XVII in FIG. 16.

A structure of another TFT will be described below. FIGS. 16 and 17 show this TFT. More specifically, a gate electrode 302 is formed on a glass substrate 301, and a gate insulating film 303 consisting of silicon nitride and having a thickness of about 3,000 Å is stacked on the gate electrode 302. A semiconductor film 304 consisting of amorphous silicon is stacked on part of the gate insulating film 303, which corresponds to the gate electrode 302. A circular source electrode 305 is formed on the semiconductor film 304. The source electrode 305 has a diameter of, e.g., about 4 µm. A drain electrode 306 is formed in an annular shape on the semiconductor film 304 substantially concentrically with the source electrode 305, thereby forming a semiconductor channel portion in a partial annular shape between the two electrodes. Since the channel portion is formed so as to surround the source electrode 305, if the distance between the two electrodes is a channel length Z, and the length of an arc defined by substantially intermediate points of the channel length l is a channel width W, the channel width W is sufficiently larger than the channel length l. Ratio l/W of channel length l to channel width W is one or less.

A plurality of TFTs 307 each arranged in the above-described manner are arrayed on the substrate 301 in the form of a matrix. The source electrode 305 of TFT 307 is connected to a pixel electrode 308 consisting of a transparent conductive substance. The drain electrodes 306 of TFTs 307 arranged in the column direction are commonly connected to a drain line 309. The gate electrodes 302 of TFTs 307 arranged in the row direction are commonly connected to a gate line 310. In addition, a plurality of pixel electrodes 308 connected to source electrodes of TFTs 307 are arrayed above the glass substrate 301 in the form of a matrix.

Figure 20:
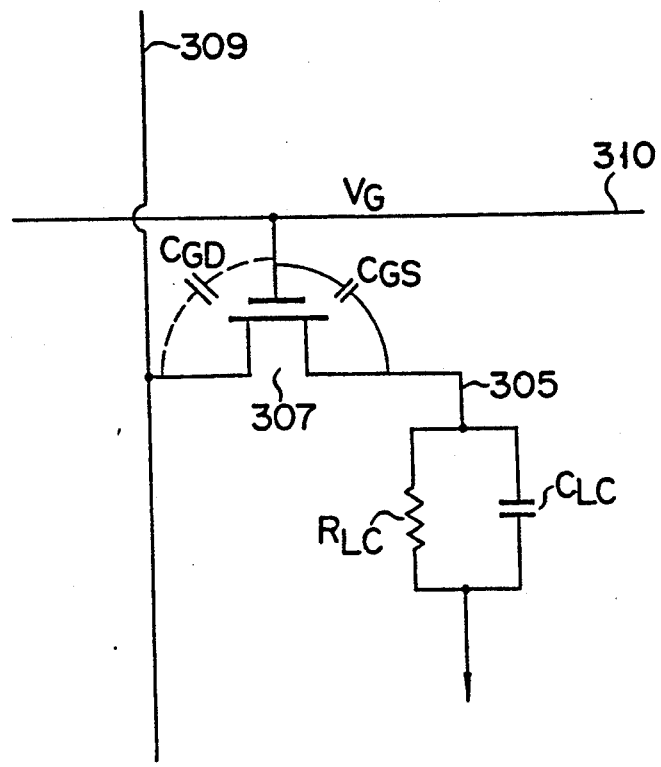
FIG. 20 is an equivalent circuit diagram of a liquid crystal display element comprising the TFTs shown in FIGS. 16 and 18.

In TFT 307, the source electrode 305 is formed so as to be smaller than the drain electrode 306. Therefore, the area where the source and the gate electrodes 305 and 302 overlap each other is considerably smaller than that where the drain and the gate electrodes 306 and 302 overlap each other. As indicated by an equivalent circuit diagram in FIG. 20, gate-source capacitance $C_{GS}$ present between the gate and the source electrodes 302 and 305 is very small. If, for example, the source electrode 305 is a circular electrode having a diameter 4 µm and the gate insulating film 303 has a thickness of 3,000 Å as is the case with this embodiment, a gate-source capacitance $C_{GS}$ is as small as about 0.003 PF. Assuming that an equivalent capacitance $C_{LC}$ between two electrodes opposing each other through the pixel electrode 308 and a corresponding liquid crystal is set to be 0.1 PF (in a case wherein the area of the pixel electrode 308 is 100 µm × 100 µm), then a voltage drop $\Delta V$ across the source electrode 305 can be represented by:

$$\Delta V = \{C_{GS}/(C_{GS}+C_{LS})\} \cdot V_g = \{0.003/(0.003+0.1)\} \cdot V_G$$

This voltage drop is as small as about 3% of gate voltage $V_g$. As described above, since the area of the source electrode 305 is made small in this TFT, the gate-source capacitance $C_{GS}$ can be made small compared with the capacitance generated between one pixel electrode and an electrode opposing the pixel electrode through a liquid crystal. Therefore, the influences of gate signals on source potentials can be reduced, and the pixel electrode 308 can be micropatterned. In addition, since the drain electrode 306 is formed so as to surround the source electrode 305, the channel width can be increased, and high drive performance of a thin film transistor can be realized.

A structure of a TFT according to still another embodiment will be described with reference to FIGS. 18 and 19. Since the fundamental structure of this TFT is the same as that of the TFT in FIGS. 16 and 17, the same reference numerals in FIGS. 18 and 19 denote the same parts as in FIGS. 16 and 17, and a description thereof will be omitted. Referring to FIGS. 18 and 19, a source electrode 312 of TFT 311 has a rectangular shape. U-shaped a drain electrode 313 is formed so as to surround rectangular the source electrode 312. Similarly, in TFT 311, the area of the source electrode 312 is made small, and hence the area where the source and the gate electrodes 312 and 302 overlap each other is small. Therefore, a gate-source capacitance $C_{GS}$ between the gate and the source electrodes 302 and 312 is small, and the influence of a gate signal on a source potential is small. In addition, since a drain electrode 313 is formed so as to surround the source electrode 312, a channel width can be set to be sufficiently large.

Furthermore, in order to increase the opening ratio by increasing the area of a pixel electrode 314 as much as possible, the pixel electrode 314 is extended so that it partially overlaps the gate electrode 302 as indicated by cross-hatched portions in FIG. 18. In this case, the gate-source capacitance $C_{GS}$ between the gate and the source electrodes 302 and 312 is determined by the sum of areas D and C where the gate and the source electrodes 302 and 312, and the gate and the pixel electrodes 312 and 314 overlap each other, as indicated by the cross-hatched portions in FIG. 18. Therefore, area C where the gate and the pixel electrodes 302 and 314 overlap each other, and area D where the gate and the source electrodes 302 and 312 overlap each other are determined such that gate-source capacitance $C_{GS}$ determined by areas C and D becomes sufficiently small compared with an equivalent capacitance $C_{LC}$ between one pixel electrode 314 and an electrode opposing the pixel electrode 314 through a liquid crystal.

Note that the source and the drain electrodes 312 and 313 may be formed into polygonal shapes without an acute angle, such as a pentagon and a hexagon, or elliptical shapes.

What is claimed is:

1. A thin film transistor array, comprising:
a single substrate;
a plurality of thin film transistors formed on said single substrate, each thin film transistor having at least a gate electrode, a semiconductor layer having a channel portion and a source electrode and a drain electrode;
a plurality of gate lines and a plurality of drain lanes provided over said single substrate in an intersecting relation via an insulating film, said gate lines and drain lines being connected to gate and rain electrodes of the transistors at locations near the respective intersections of the gate and rain lines;
a plurality of transparent electrodes electrically connected to the source electrodes and providing a matrix array arranged in a plurality of regions surrounded with the gate and drain lines, respectively;
a transparent insulating film formed at least on said thin film transistor, said gate lines and said drain lines, said transparent insulating film having a first surface which is in contact at least with said thin film transistors and said gate and drain lines, and a second surface which is an opposite surface opposing said first surface; and
a single light shield film formed on said second surface of said transparent insulating film, said single light shield film being over said single substrate so as to cover the channel portions of said transistors, said gate lines, and said drain lines, and said single light shield film having a width which is not less than an interval between adjacent peripheral edges of said plurality of transparent electrodes, so as to overlap the edges of said plurality of transparent electrodes, to thereby shield said plurality of transparent electrodes, to thereby shield said channel portions from light and to shut of light leaking from among a plurality of transparent electrodes.

2. A thin film transistor array according to claim 1, wherein said light shield film is formed of a resin.

3. A thin film transistor array according to claim 1, wherein said light shield film is formed of a metal oxide.

4. A liquid crystal device, comprising:
a single first substrate;
a plurality of thin film transistors formed on said single first substrate, each thin film transistor having at least a gate electrode, a semiconductor layer having a channel portion, a source electrode nd a drain electrode;
a plurality of gate lines and a plurality of drain lines provided over said single first substrate in an intersecting relation via an insulating layer, said gate lines and drain lines being connected of gate and drain electrodes of the transistors a locations near the respective intersections of the gate and drain lines;
a plurality of transparent electrodes electrically connected to the source electrodes and providing a matrix array arranged in a plurality of regions surrounded with the gate and drain lines, respectively;
a transparent insulating film formed at least one said thin film transistors, said gate lines nd said drain lines, said transparent insulating film having a first surface which is in contact at least with said thin film transistors and said gate and rain lines, and a second surface which is an opposite surface opposing said first surface; and
a single light shield film formed on said second surface of said transparent insulating film, said single light shield film being provided over said single first substrate so as to cover the channel portions of said transistors, said gate lines, and said drain lines, and said single light shield film having a width which is not less than an interval between adjacent peripheral edges of said plurality of transparent electrodes so as to overlap the edges of said plurality of transparent electrodes, to thereby shield said channel portion from light and to shut off light leaking from among a plurality of transparent electrodes;
a second substrate having an opposite electrode arranged opposite to said plurality of transparent electrodes, said second substrate being joined to said single first substrate by a sealing material with a predetermined space between said single first substrate and said second substrate; and
a liquid crystal material sealed in said predetermined space in an area surrounded by said single first substrate, said second substrate nd said sealing material.

5. A thin film transistor array, comprising:
a single substrate;
a plurality of thin film transistors formed on said single substrate, each thin film transistor having at least a gate electrode, a semiconductor layer having a channel portion and a source electrode, and a drain electrode;
a plurality of gate lines and a plurality of drain lines provided over said single substrate in an intersecting relation via and insulating film, said gate lines and drain lines being connected to gate and drain electrodes of the transistors at locations near the respective intersections of the gate and drain lines;
a plurality of transparent electrodes electrically connected to the source electrodes and providing a matrix array arranged in a plurality of regions surrounded with the gate and drain lines, respectively;
a transparent insulting film formed at least on said thin film transistor, said gate lines and said drain lines, said transparent insulating film having a first surface which is in contact at least with said thin film transistors and said gate and drain lines, and a second surface which is an opposite surface opposing said first surface; and
a single light shield film formed on said second surface of said transparent insulating film, said single light shield film being over said single substrate so as to cover the channel portions of said transistors, said gate lines, and said drain lines, and said single light shield film having a width which is substantially equal to an interval between adjacent peripheral edges of said plurality of transparent electrodes, so as to overlap the edges of said plurality of transparent electrodes, of thereby shield said channel portions from light and to shut off light leaking from among a plurality of transparent electrodes.

6. A liquid crystal device, comprising:
a single first substrate;
a plurality of thin film transistors formed on said single substrate, each thin film transistor having at least a gate electrode, a semiconductor layer having a channel portion and a source electrode, and a drain electrode;

a plurality of gate lines and a plurality of drain lines provided over said single first substrate in an intersecting relation via and insulating layer, said gate lines and drain lines being connected to gate and rain electrodes of the transistors at locations near the respective intersections of the gate and drain lines;

a plurality of transparent electrodes electrically connected to the source electrodes and providing a matrix array arranged in a plurality of regions surrounded with the gate and drain lines, respectively;

a transparent insulating film formed at least one said thin film transistor, said gate lines and said rain lines, said transparent insulating film having a first surface which is in contact at least with said thin film transistors and said gate and drain lines, and a second surface which is an opposite surface opposing said first surface; and a single light shield film formed on said second surface of said transparent insulating film, said single light shield film being over said single first substrate so as to cover the channel portions of said transistors, said gate lines, and said drain lines, and said single light shield film having a width which is substantially equal to an interval between adjacent peripheral edges of said plurality of transparent electrodes, so as to overlap the edges of said plurality of transparent electrodes, to thereby shield said channel portions from light and to shut off light leaking from among a plurality of transparent electrodes;

a second substrate having an opposite electrode arranged opposite to said plurality of transparent electrodes, said second substrate being joined to said single first substrate by a sealing material with a predetermined space between said single first substrate and said second substrate; and a liquid crystal material sealed in said predetermine space in an area surrounded by said single first substrate, said second substrate and said sealing material.

7. A thin film transistor array according to claim 1, wherein said single light shield film has a width which is larger than an interval between adjacent peripheral edges of said plurality of transparent electrodes.

8. A liquid crystal device according of claim 4, wherein said single light shield film has a width which is larger than an interval between adjacent peripheral edges of said plurality of transparent electrodes.

* * * * *